United States Patent
Feuer et al.

(10) Patent No.: US 7,085,454 B2
(45) Date of Patent: Aug. 1, 2006

(54) METHOD FOR FABRICATING OPTICAL DEVICES BY ASSEMBLING MULTIPLE WAFERS CONTAINING PLANAR OPTICAL WAVEGUIDES

(75) Inventors: Mark D. Feuer, Colts Neck, NJ (US); Nicholas J. Frigo, Red Bank, NJ (US)

(73) Assignee: AT&T Corp., New York, NY (US)

( * ) Notice: Subject to any disclaimer, the term of this patent is extended or adjusted under 35 U.S.C. 154(b) by 83 days.

(21) Appl. No.: 10/985,822

(22) Filed: Nov. 10, 2004

(65) Prior Publication Data

US 2005/0094942 A1    May 5, 2005

Related U.S. Application Data

(62) Division of application No. 10/362,954, filed as application No. PCT/US01/27393 on Sep. 4, 2001.

(60) Provisional application No. 60/230,205, filed on Sep. 5, 2000.

(51) Int. Cl.
*G02B 6/26* (2006.01)

(52) U.S. Cl. ............... 385/50; 385/15; 385/39; 359/333

(58) Field of Classification Search .......... 385/15, 385/39, 50
See application file for complete search history.

(56) References Cited

U.S. PATENT DOCUMENTS 5,357,363 A  *  10/1994  Li et al. ............ 398/141

* cited by examiner

*Primary Examiner*—Jennifer Doan

(57) ABSTRACT

A method for fabricating optical devices comprises the steps of preparing a first substrate wafer with at least one buried optical waveguide on an approximately flat planar surface of the substrate and a second substrate wafer with at least a second buried optical waveguide. The waveguides so formed may be straight or be curved along the surface of the wafer or curved by burying the waveguide at varying depth along its length. The second wafer is turned (flipped) and bonded to the first wafer in such a manner that the waveguides, for example, may form an optical coupler or may crossover one another and be in proximate relationship along a region of each. As a result, three dimensional optical devices are formed avoiding conventional techniques of layering on a single substrate wafer. Optical crossover angles may be reduced, for example, to thirty degrees from ninety degrees saving substrate real estate.

7 Claims, 5 Drawing Sheets

METHOD FOR FABRICATING OPTICAL DEVICES BY ASSEMBLING MULTIPLE WAFERS CONTAINING PLANAR OPTICAL WAVEGUIDES

This application is a Divisional application of Ser. No. 10/362,954 filed Feb. 26, 2003 a National Filing pursuant to 35 U.S.C. 371 based upon International Application No. PCT/US01/27393, filed Sep. 4, 2001, which claims priority to U.S. Provisional Application No. 60/230,205, filed Sep. 5, 2000.

BACKGROUND OF THE INVENTION

1. Technical Field

The present invention relates to the field of fabricating optical devices and, more particularly, to a method for fabricating optical devices, including, for example, couplers and crossovers, by individually assembling multiple wafers, each containing at least one planar optical waveguide (POW), and bonding the wafers together to form said optical devices and the optical devices fabricated by such a method of fabricating.

2. Description of the Related Arts

The defining element of planar optical waveguide (POW) technology is the optical waveguide itself, a region of relatively high refractive index which is typically much longer than it is wide or deep, formed, for example, by diffusion on a substrate wafer of lower refractive index material. Light is bound to the high-index guide, eliminating the natural diffraction spreading of a free light beam and allowing the light to be turned through curving paths. Typically, the waveguides are fabricated near the (approximately planar) surface of the substrate wafer, like the interconnections in an electronic integrated circuit.

Current planar waveguide technology has been focused on a single layer of waveguides, which, for example, severely limits crossing of waveguides. A few research results have explored three dimensional couplers in semiconductor materials, but that work requires multiple epitaxial growth processes of layers on a single wafer, an expensive process which has not been extended to glass waveguides. Presently, as many as seven layers may be grown on a substrate with different properties, but with each additional layer, complications in tolerances result. Recently, Raburn et al. in their paper *Double-Bonded InP/InGaAsP Vertical Coupler 1:8 Beam Splitter*, published in "IEEE Photonics Technology Letters", Vol. 12, December, 2000, disclose a three layer double bonding process where the three layers are grown using vapor deposition. A first wafer with etched waveguides is bonded to a blank second wafer. The second wafer is then etched and a third wafer bonded. A waveguide of one layer may be at a different height than another waveguide of another layer.

Direct wafer bonding processes are known, for example, from Zhu et al., *Wafer Bonding Technology and its Application in Optoelectronic Devices and Materials*, published in "IEEE Journal of Selected Topics in Quantum Electronics," vol. 3, pp. 927–936, 1997 and from Black et al., *Wafer Fusion: Materials Issues and Device Results*, published in IEEE Journal of Selected Topics in Quantum Electronics," vol. 3, pp. 943–951, 1997.

Consequently, there remains a need in the art for improved methods of fabricating optical devices and, in particular, couplers and cross-overs having different properties than conventional optical devices.

SUMMARY OF THE INVENTION

We propose to individually assemble and bond two planar waveguide substrate wafers together according to the desired optical device. The surfaces of the individual substrate wafers are placed and then bonded face-to-face according to known bonding techniques to fabricate the desired optical device so that the waveguides are in appropriate, proximate relationship to one another depending on the device to be fabricated. Where waveguides cross each other at an angle forming a crossover, an interconnection crossover between waveguides results, with much better isolation and lower crosstalk than the crossthroughs achieved in conventional single-wafer technology. Also, it will be shown that wafer real estate may be preserved in crossovers as the crossover angle may be substantially reduced from, for example, ninety degrees to a substantially lesser angle such as thirty degrees.

Where waveguides are at least in part constructed with parallel segments on the substrate wafers, for example, forming a coupler, overlap of optical modes creates a three-dimensional (3D) optical coupler linking the upper waveguide of one substrate wafer and a lower waveguide of a second substrate wafer. (By parallel segments is intended the construction of waveguide segments in a line whereby the two line segments are in the same plane and the waveguide segments are optically coupled.) By appropriate design of the waveguides and one or more interaction regions, the energy transfer may be complete or partial, wavelength-selective or broadband, polarization-selective or polarization-independent. The proposed method of fabrication may fabricate couplers between dissimilar waveguides, such as a pump coupler which directly connects an undoped waveguide carrying pump light to an Erbium (Er)-doped waveguide which amplifies signal light.

The invention, for example, will enhance the optical transport and routing systems at the heart of a telecommunications network to be made smaller, cheaper, more reliable and more capable. In particular, Er-doped waveguide amplifiers (EDWAs) fabricated according to the proposed method may replace bulkier Er-doped fiber amplifiers in transport systems in which three dimensional couplers fabricated according to the present invention may be used to improve the gain, power efficiency, and wavelength flatness of existing EDWAs. Improved EDWAs should also play an important role inside optical switches and routers, to overcome the loss of passive components. Three dimensional optical couplers may also serve as channel selection and noise reduction filters inside highly integrated DWDM systems. Also, the high-isolation crossovers enabled by the proposed wafer bonding process may enable sophisticated routing photonic integrated circuits (PICs), eliminating much of the fiber congestion and complexity associated with backplanes and front panels of current DWDM equipment. The present invention will allow PICs to be simultaneously more compact and more capable. Also, the photolithography needed for fabrication of 3D couplers by wafer assembly is less demanding than that needed for single layer couplers. Finally, the creation of couplers between dissimilar waveguides, difficult or impossible with single-layer techniques, is practical with wafer assembly. Glass or silica waveguides, which are preferred for EDWAs and most passive devices, are easily accommodated by the present technique.

Planar optical waveguide (POW) technologies and fabrication in accordance with the proposed process enable a broad range of optical devices by routing light along controlled paths near the surface of a substrate wafer. In some cases, the routing is simple, such as a Fabry-Perot laser, which guides light back and forth through an amplifying region until feedback causes a controlled oscillation. In others, the routing may be quite complex, involving switching and/or multipath interferometry. Although similar functions can often be achieved with fiber- or free-beam technologies, planar waveguide provides the most compact implementation of complex devices, with the greatest mechanical stability.

BRIEF DESCRIPTION OF THE DRAWINGS

FIG. 2 show three dimensional wafer bonding assembly according to the present invention, for example, for fabricating a waveguide crossover wherein FIG. 2(a) shows the separate preparation of two wafers each having a waveguide diffused thereon, and a direction of flipping to fabricate a three dimensional crossover shown in isometric view while

FIG. 4 shows a three dimensional wafer bonding assembly according to the present invention, for example, for fabricating a three dimensional optical coupler wherein

DETAILED DESCRIPTION OF PREFERRED EMBODIMENTS

Figure 1A:
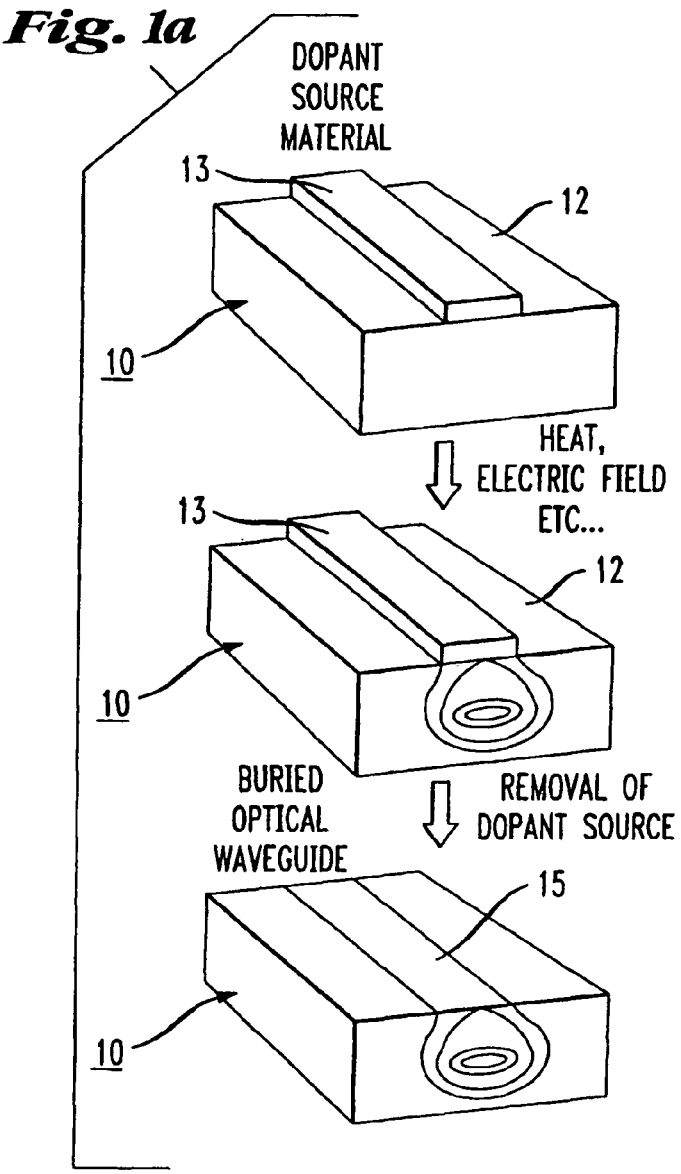
FIG. 1(a) shows a conventional diffusion method of fabricating a planar optical waveguide on a substrate wafer, depth of the waveguide 15 being determined by diffusion time, temperature, electric field density and other factors.

FIG. 1(a) shows a conventional diffusion method of fabricating a planar optical waveguide 15 on a substrate wafer 10, the depth of the waveguide 15 being determined by diffusion time, temperature, electric field density as well as other known factors. A defining element of planar optical waveguide (POW) technology is the optical waveguide itself, a region 15 of relatively high refractive index which is typically much longer than it is wide or deep, surrounded by wafer substrate material of lower refractive index. Light is bound to the high-index guide 15, eliminating the natural diffraction spreading of a free light beam and allowing the light to be turned through curving paths as necessary. Typically, the waveguides are fabricated near the (approximately flat and planar) surface 12 of a substrate wafer 10, like the interconnections in an electronic integrated circuit. (However, per FIG. 1(b) and FIG. 6(c), some embodiments may involve burying the waveguides more deeply, for example, at the center of the substrate wafer than at the points of entry to intentionally build a crossover or other optical device.) Waveguides 15 may be fabricated, for example, by deposition and etching, ion implantation, diffusion techniques, or other known techniques, and the materials forming the wafer substrate 10 may be semiconductors, crystalline dielectrics, glasses, or polymers, among other known materials. Although many implementations are possible, one preferred embodiment may comprise diffused waveguides in glass, an economical technology with some specific advantages discussed further below.

Figure 1B:
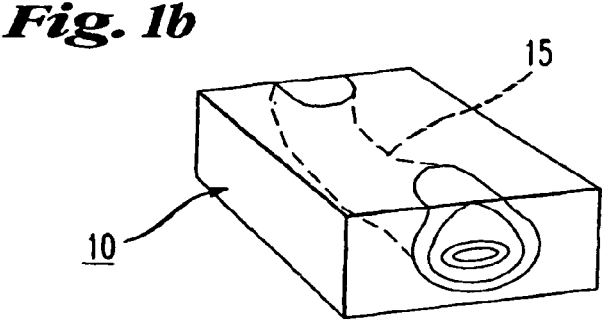
FIG. 1(b) shows the result of burying a waveguide segment more deeply in the center of a substrate wafer than the points of entry at either end of a waveguide.

Following from left to right in FIG. 1(a), formation of diffused waveguides 15 begins with preparation of a substrate wafer 10 with controlled properties at surface 12. Patterned areas (typically straight or curved stripes) of a diffusion source material 13, which may be dopant, are deposited onto the approximately flat, planar surface 12. Then the composite structure 10 is subjected to heat and/or an electric field in a controlled manner, allowing dopant ions to diffuse from the source layer into the substrate 10 and producing regions of increased refractive index where the diffusion source overlay 13 is present. The waveguide depth and the lateral spreading at the pattern edges are determined by the appropriate choice of materials and process conditions. Electric fields may be applied during the process to obtain more flexible control of vertical and horizontal dopant profiles. Dopant in-diffusion is a simple process, adaptable to small- or large-scale production of optical waveguides 15 and has been commercially applied to lithium niobate optical modulators. Other suitable processes may be employed to advantage depending on the desired optical device. At the right of FIG. 1(a) is shown the wafer 10 with waveguide 15 implanted but with dopant source material still present. Finally, the dopant source material is removed and the top surface planed leaving the wafer 10 complete with planar optical waveguide 15 implanted. That is, the waveguide lies in a plane parallel to the approximately flat planar surface of the substrate wafer. As already indicated, the finished product is shown in FIG. 1(a) with a straight waveguide 15 appearing to be at even depth. In fact, by varying the initial location of dopant source material, degree of heat and field intensity, curvature and depth and other measurable characteristics of the formed waveguide 15 may be varied as shown in FIG. 1(b). In this figure, the waveguide is intentionally buried more deeply in the center of the wafer with substrate material covering the waveguide in the center. Thus, the waveguide may follow a, for example, vertically curved path through the substrate.

Figure 2A:
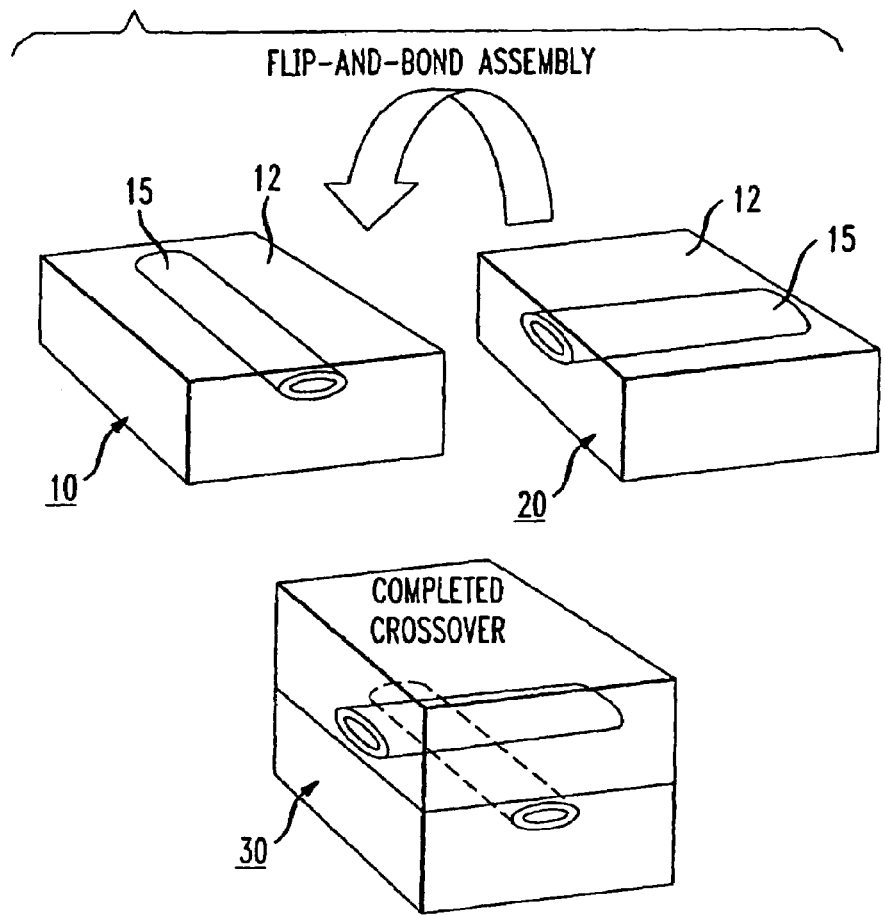
Figure 2B:
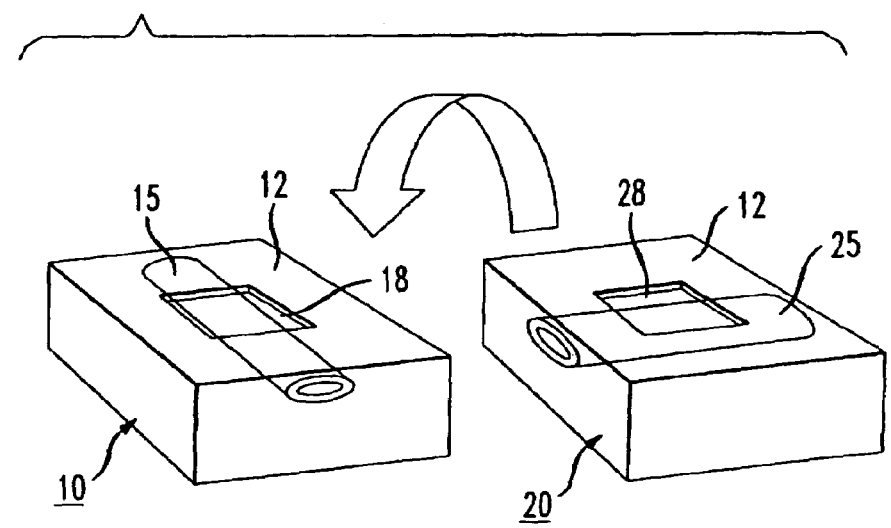
FIG. 2(b) shows the additional step of etching recessed areas in the vicinity of each crossing waveguide to improve isolation and crosstalk performance.

Referring to FIG. 2, there is shown the process of fabricating, for example, a three-dimensional optical crossover according to the present invention which employs the conventional processes of FIG. 1 in preparing at least first and second wafer substrates. Moving from left to right in FIG. 2(a), a wafer substrate 10 has diffused or otherwise deposited therein at least one waveguide 15 formed on or near preferably planar surface 12. (Similar reference numerals have been used between FIGS. 1 and 2 to refer to similar elements since FIG. 2 relies in part on POW waveguide formation as per FIG. 1). A second substrate wafer 20 may be similarly formed having one or more waveguides 25 diffused or otherwise implanted therein. The first wafer substrate 10 may be then used as a stationary substrate for receiving a flipped wafer substrate 20 as a second layer of a completed device to form a completed three dimensional optical crossover 30 (shown to the right of FIG. 2(a). In an alternative embodiment and to improve crosstalk isolation and per FIG. 2(b), recessed areas 18 and/or 28 may be formed in one or the other wafer substrate 10 or 20 or both prior to flipping and bonding. If two recessed areas 18, 28 are formed, they may preferably match after flipping. When a recess is formed in one or the other or both substrates, the recess(es) will form a void which may be filled to contain inert gas, a vacuum or other desired medium as will be discussed further below. As will be further discussed in connection with FIG. 6, the crossover angle may be reduced from ninety degrees to a much smaller angle, for example, thirty degrees, more or less, using the proposed method of fabrication of the present invention saving wafer real estate.

Figure 3A:
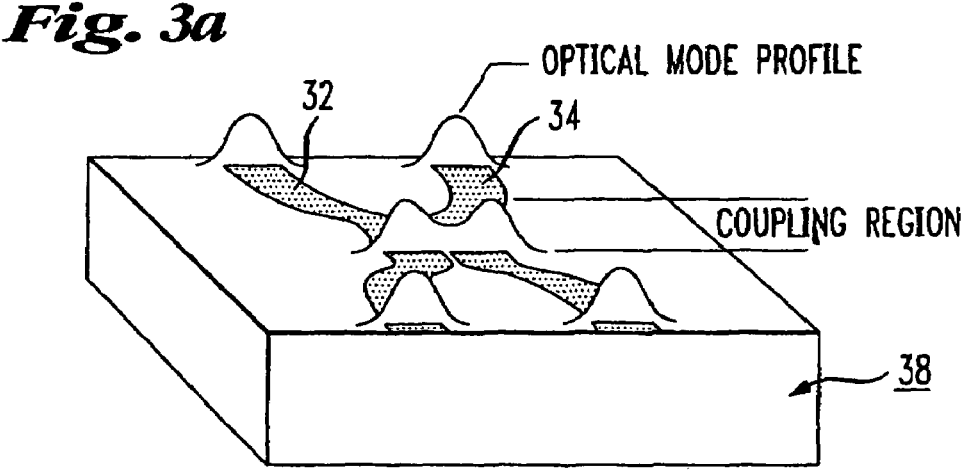
FIG. 3 shows a conventional process for fabricating a simple two-mode optical coupler utilizing single-layer planar optical waveguide fabrication wherein FIG. 3(a) provides an isometric view and FIG. 3(b) a top view.
Figure 3B:
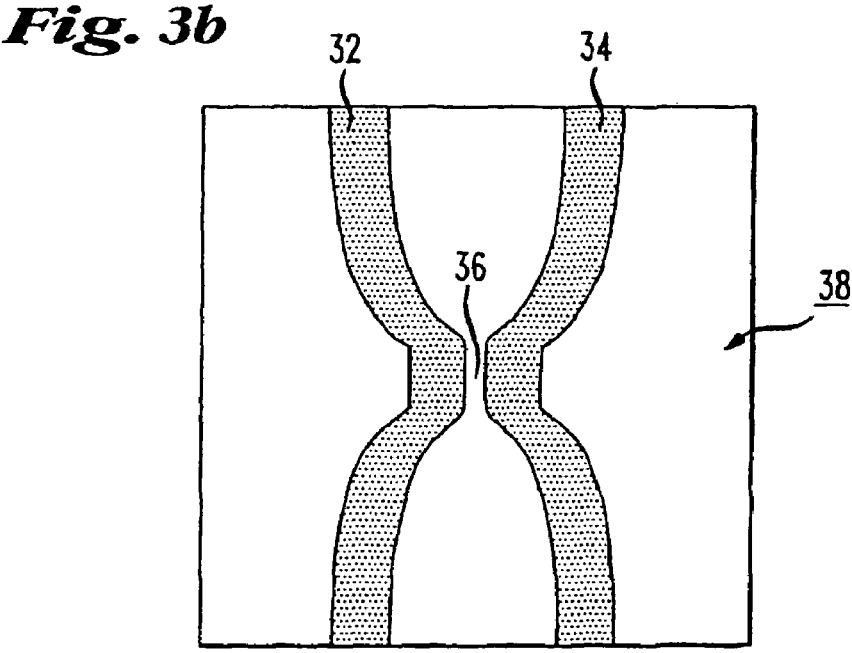

A key building block of POW devices is the conventional two-mode coupler shown in FIG. 3. At the opposite edges of the substrate, where the two waveguides 32 and 34 are well-separated on substrate wafer 38, there is negligible overlap of the optical modes, and no energy is transferred from one waveguide to the other. In contrast, mode overlap is stronger in a central interaction region 36, leading to coupling of the waveguide modes and a predictable shift of light from one waveguide to the other. By appropriate design of the waveguides and the interaction region, the energy transfer may be complete or partial, wavelength-selective or broadband, polarization-dependent or not. If the interaction region can be controlled by a parameter such as temperature, application of light or electric field, a switch may be realized. In most POW devices, these optical couplers are laid out laterally, between two waveguides at the same constant depth relative to the planar surface. The fabrication process of FIG. 4, as discussed below, provides an alternative, vertical or three-dimensional (3D) coupler in which not all waveguides fall within a single plane but are closely proximate to one another and may lie in proximate parallel planes.

Vertical or 3D couplers in semiconductor materials have been constructed previously by fabricating two layers of waveguides on a single substrate. Up to seven layers are known. In contrast, we propose that two or more substrates, each prepared with a single layer of waveguides, be juxtaposed so that the optical modes of waveguides on different wafers overlap with each other. A practical, stable means of assuring the required intimate contact is the use of direct wafer bonding as introduced in the Description of the Related Arts section above or in accordance with other well known bonding techniques. The process may use wafer substrates with smooth, clean surfaces that may be treated with heat and pressure to form a strong, adhesive-free bond. Wafer bonding has been demonstrated with a wide variety of matched and mismatched substrates, including commercial fabrication of silicon-on-insulator wafers. The proposed assembly is illustrated in FIGS. 2 (cross-over), 4 (coupler) and 5 (a waveguide switch) among other possible devices.

Figure 4A:
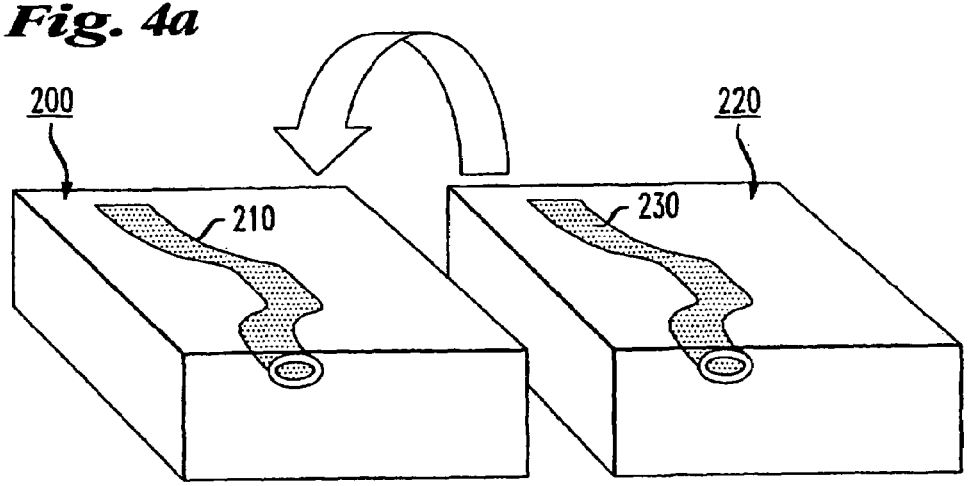
FIG. 4(a) shows, for example, the diffusion of identical waveguides on identical substrates and a flipping of one on to the other, forming the isometric view (FIG. 4(b)) and top view (FIG. 4(c)) of a three dimensional coupler fabricated according to the principles of the present invention.
Figure 4B:
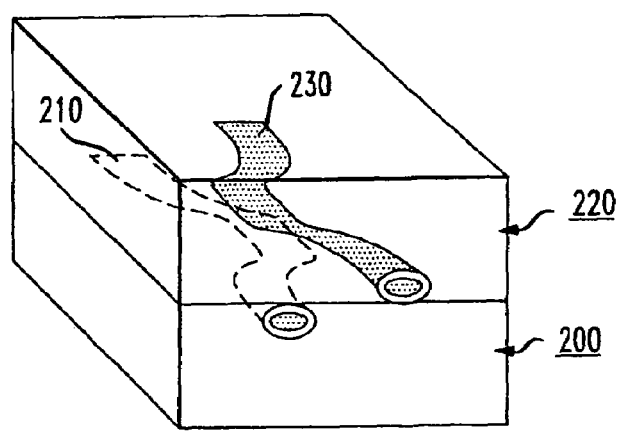
Figure 4C:
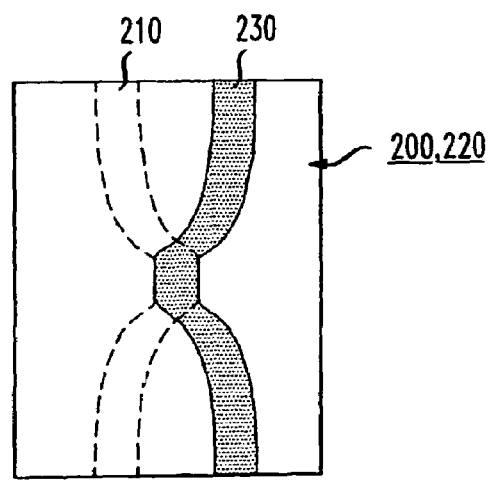

Referring to FIG. 4, there is shown a method of fabricating a three dimensional optical coupler. A first substrate wafer 200 has formed thereon a first curved waveguide 210 along the approximately flat, planar surface of wafer 200. A second identical wafer 220 has a second waveguide 230 formed therein in the same manner. Of course, the forming of identical waveguides on identical wafers has some economic advantages over forming differently shaped waveguide(s) on the second wafer, but such is possible within the principles of the present invention. As in FIG. 2, the second wafer 220 is flipped so that the formed waveguides are in close proximity after flipping and bonded to the first wafer 200 forming a completed three dimensional coupler shown in isometric view in FIG. 4(b) and in top view in FIG. 4(c) having a central coupling region.

The depicted, wafer-bonded 3D coupler of FIG. 4(b) or (c) can enable a wide variety of novel and capable devices. One major advantage of the process is its ability to construct couplers between radically different waveguides, rather than identical waveguides as shown. For example, the waveguides 210, 230 on the two substrates 200, 220 may be derived from different dopant ions or treated at different diffusion temperature or electric field, to obtain different optical mode shapes or propagation velocities. The implanted waveguides may lie in parallel planes in the completed coupler device or not as the designer chooses. For example, the designer may vary the depth of implantation of the waveguides 210, 230 along their length per FIG. 1(b) or their paths through the substrate, for example, one curved, one straight or varying the curvature of the separate waveguide paths. The substrates into which waveguides are diffused may also differ. An Erbium (Er) doped waveguide amplifier (EDWA) constructed from one Er-doped waveguide, for example, waveguide 210, and one passive Er-free waveguide, for example, waveguide 230, is a useful instance of this idea. The active Er-doped waveguide can be optimized to amplify the signal light, while the Er-free waveguide is independently optimized to transport pump light with very low loss. Unlike conventional end-pumped EDWAs, the wafer-bonded EDWA of the present invention can be designed with multiple pumping locations inside the length of the active region, to assure good noise figure and efficient pump utilization at all points in the amplifier. The use of 3D couplers according to the present invention is also valuable in distributing pump power to arrays of waveguide amplifiers and in combining power from redundant pumps, due to the enhanced crossover capabilities discussed below.

In addition to its use for pump light routing, the 3D coupler of FIG. 4 can also contribute wavelength shaping filters to EDWAs. A coupler which extracts light at the spontaneous emission peak can be used to equalize the amplifier's gain spectrum, providing any tailored specific shape desired, for example, the flat wavelength response needed for wavelength-division multiplexed systems. Mid-amplifier filtering usually provides the best noise and power efficiency, and a 3D coupler according to FIG. 4 offers the unique opportunity of filtering in the mid-stage of the amplifier without breaking the active waveguide.

There are several ways in which 3D couplers constructed according to the principles depicted in FIG. 4 may enhance the performance of wide-band EDWAs, including compound amplifiers which cover both C-band (typically from 1525–1565 nm) and L-band (typically from 1565–1615 nm). First, 3D couplers may be used to inject pump light from pump lasers at two or more wavelengths. Second, 3D couplers may be placed to inject pump light at strategic points along an active waveguide which has varying dopant composition along its length. Third, wavelength-selective 3D couplers may be used to route C-band and L-band signals to the appropriate paths in a compound amplifier.

In alternative embodiments, one (or more than one) optical crossover may enable distribution of a single pump source via optical coupling to not only one amplifying waveguide but two or more amplifying waveguides. One of ordinary skill in the art may construct a compound, complex device having signal distribution among waveguides only limited by the imagination.

Figure 5:
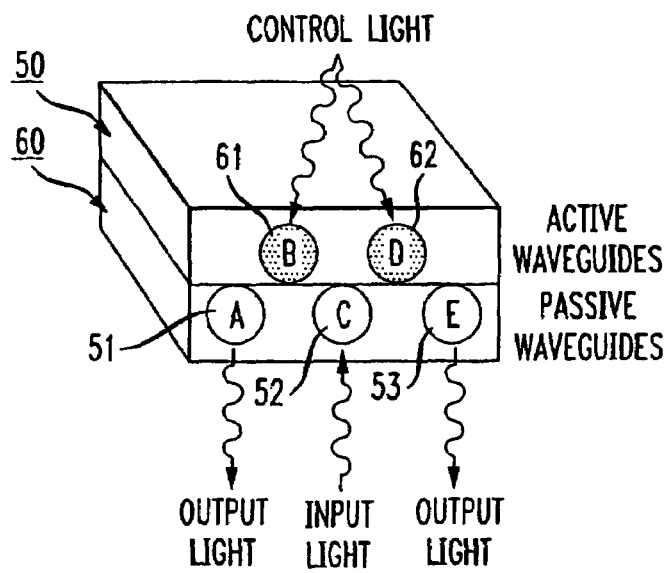
FIG. 5 shows the fabrication of an optically triggered waveguide switch in accordance with the present invention.

Mating of active and passive waveguides can also enable an optically triggered waveguide switch, as shown in FIG. 5. The active waveguides B and D, 60 and 62, are doped with saturable absorber ions. These can be pumped to a higher energy state by optical injection at the resonant wavelength, which will saturate the absorption and shift the refractive index at non-absorbing wavelengths. Thus, if waveguide B 61 is optically pumped at its resonant wavelength, its refractive index at longer, transparent wavelengths will be lower than that of unpumped waveguide D 62. Thus, long-wavelength light from input waveguide C 52, a passive waveguide, will be preferentially coupled into waveguide D 62. Subsequent coupling to passive waveguide E 53 can be used if it is desirable for the output waveguide to be undoped. If the optical pumping is moved from waveguide B 61 to waveguide D 62, the signal output can be switched to output waveguide A 51 from waveguide E 53.

Another advantage of 3D couplers is flexible and reproducible tailoring of the coupling strength between the coupled waveguides. In a conventional lateral coupler per FIG. 3 built from a single layer of waveguides, the coupling strength is very sensitive to any errors in waveguide spacing. At the same time, lithography and patterning are made more difficult by the close approach of multiple waveguides. In contrast, the 3D coupler of FIG. 4 allows independent lithography and patterning of the two waveguides 210, 230, while reducing sensitivity to lateral placement errors. Realizing the 3D coupler by wafer bonding of diffused waveguides offers an additional degree of customization: the coupling strength can be tuned, either before or after wafer bonding, by adjusting the diffusion parameters to control waveguide depth as shown in FIG. 1(b).

Figure 6A:
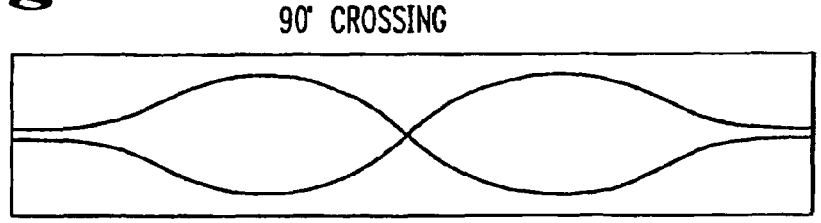
FIG. 6 shows construction of a typical crossover angle of approximately ninety degrees in FIG. 6(a) and how a substantially lesser angle, for example, a thirty degree crossover angle may be achieved and wafer real estate saved in FIG. 6(b) utilizing a variant of the method of fabricating an optical crossover of FIG. 2.
FIG. 6(c) is an alternative embodiment in cross-sectional view of a device fabricated according to the present invention in which waveguides are implanted having varying depth in the planar substrate as taught in FIG. 1(b), thus forming a crossover of waveguide segments by varying the depth of their fabrication. In the design of FIG. 6(c), a substantially reduced crossover angle may also be achieved.
Figure 6B:
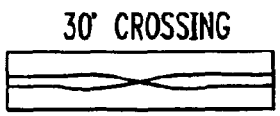

Three dimensional waveguide couplers per FIG. 4 also offer powerful capabilities for crossovers in photonic circuits. In conventional single-layer technology, waveguides cannot physically cross over one another, they must cross through each other, introducing crosstalk and loss in both paths. Although these impairments can be made manageable by relying on large intersection angles, the resulting circuits consume a lot of expensive real estate on the wafers (FIG. 6a). FIG. 6(a) shows a conventional crossover at ninety degree angles and how wafer real estate is wasted. By coupling light into a second layer for the crossover, it becomes possible to achieve low crosstalk and loss with much smaller crossing angles, for example, on the order of thirty degrees, yielding a more compact, cost-effective photonic circuit (FIG. 6b) using far less wafer real estate.

Figure 6C:
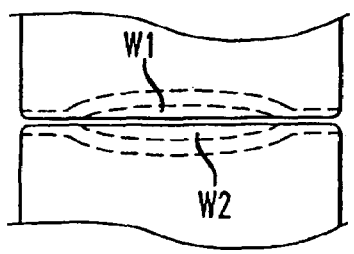

For even more compact circuits, it may be desirable to arrange weaker coupling for the crossover areas than for the coupler areas. There are two possibilities for achieving this area-selective coupling strength. First, waveguides may be vertically curved by varying depth of implant (or curved along the horizontal planar surface of each substrate); that is, the waveguides may be implanted deeper (weaker coupling) in some regions than they are in others of the substrate wafer. FIG. 6(c) is an alternative embodiment in cross-sectional side view of a device fabricated according to the present invention in which the waveguides are implanted in each substrate wafer at variable depth. Variable-depth waveguides may be fabricated in each substrate by applying localized electric fields during diffusion, by applying localized regions of higher temperature (such as by laser heating), or by localized ion implantation to accelerate the diffusion process. In FIG. 6(c), a crossover angle of substantially less than 90 degrees, for example, thirty degrees can also be achieved. Alternatively, coupling may be weakened in regions of waveguide crossover simply by creating, for example, a rectangular recessed area 18 or 28 in one or both substrates before wafer bonding, as shown in FIG. 2. After assembly as shown in either FIG. 2, the crossover areas will have local voids between the upper and lower waveguides.

The depicted recessed areas may have rectangular or curved shape and, if rectangular, are of even depth, but may be of other shape and depth according to desired results. Whether filled with vacuum, air, or an inert gas, the voids formed by recessed area(s) 18, 28 and as shown in FIG. 2 will have a refractive index much lower than that of the glass substrates, ensuring an effective decoupling in the crossover areas and improved crosstalk performance. The recessed areas may be intentionally filled with another material or composition of solids, liquids and/or gases that may have an optical filtering or other attenuating effect at one or more wavelengths.

As a final note, it may be understood by one of ordinary skill in the art that the wafer-bonded 3D coupler technology is not limited to two layers of waveguides. As has been noted in other types of wafer-bonded devices, the bond is very strong, and it is quite practical to polish away the body of the upper substrate, and then to bond on a third wafer, (which may be flipped or not flipped before bonding) to obtain more complex composite structures. Moreover, other embodiments and other optical devices than those described above may be formed using the principles of the present invention simply described in the drawings as a flip and bond assembly of planar optical waveguide substrate wafers. All articles referenced herein should be deemed to be incorporated by reference as to any subject matter deemed essential to an understanding of the present invention and/or conventional waveguide diffusion and/or wafer bonding technology.

We claim:

1. An optical amplifier apparatus, comprising:
   at least one waveguide capable of optical gain;
   at least one optical coupler capable of extracting light from said amplifying waveguide without interrupting or terminating said amplifying waveguide
   wherein said at least one optical coupler extracts light at selected wavelengths to achieve an equalized gain spectrum of predetermined shape for an optical amplifier.

2. The apparatus of claim 1 in which said gain spectrum of predetermined shape comprises a wavelength flattened shape.

3. An optical switch apparatus comprising at least one waveguide capable of saturable absorption, coupled to at least one optical coupler comprising at least one wafer containing at least one buried optical waveguide assembled and bonded to at least one other wafer containing at least one buried optical waveguide, the bonded wafers being positioned with respect to one another and forming said optical coupler such that different regions of each waveguide are formed by the bonding to be in optical relationship to one another.

4. An optical switch apparatus comprising at least one optical coupler comprising at least one wafer containing at least one buried optical waveguide assembled and bonded to at least one other wafer containing at least one buried optical waveguide, the bonded wafers being positioned with respect to one another and forming said optical coupler such that different regions of each waveguide are formed by the bonding to be in optical relationship to one another, and wherein the refractive index of at least a portion of one waveguide is controlled to determine routing of at least one optical signal through the switch.

5. An optical switch apparatus as recited in claim 4, wherein a control is provided optically.

6. An optical switch apparatus as recited in claim 5, wherein said optical control is provided by at least one waveguide.

7. An optical switch apparatus as recited in claim 4, wherein a control is provided electrically.

* * * * *